United States Patent
Lin

(10) Patent No.: US 10,966,233 B2
(45) Date of Patent: Mar. 30, 2021

(54) METHODS AND DEVICES FOR INFORMATION TRANSMISSION

(71) Applicant: GUANGDONG OPPO MOBILE TELECOMMUNICATIONS CORP., LTD., Guangdong (CN)

(72) Inventor: Yanan Lin, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/404,395

(22) Filed: May 6, 2019

(65) Prior Publication Data

US 2019/0261404 A1 Aug. 22, 2019

Related U.S. Application Data

(63) Continuation of application No. PCT/CN2018/072418, filed on Jan. 12, 2018.

(51) Int. Cl.
*H04W 72/12* (2009.01)
*H04L 1/00* (2006.01)
(Continued)

(52) U.S. Cl.
CPC ....... *H04W 72/1284* (2013.01); *H04L 1/0026* (2013.01); *H04L 5/0053* (2013.01);
(Continued)

(58) Field of Classification Search
CPC ... H04W 72/0406–042; H04W 72/1284–1289; H04L 1/0023;
(Continued)

(56) References Cited

U.S. PATENT DOCUMENTS 9,854,569 B2 12/2017 Yang et al.
9,955,356 B2 4/2018 Xiong et al.
(Continued)

FOREIGN PATENT DOCUMENTS

CN 106301700 A 1/2017
CN 106664520 A 5/2017
(Continued)

OTHER PUBLICATIONS

International Search Report in international application No. PCT/CN2018/072418, dated Sep. 27, 2018.
(Continued)

*Primary Examiner* — Eric Myers
(74) *Attorney, Agent, or Firm* — Ladas & Parry LLP

(57) ABSTRACT

The application provides a methods and devices for information transmission. The method includes that: a terminal device receives control signaling transmitted by a network device at a first time position; and the terminal device transmits a Scheduling Request (SR) and/or feedback information related to the control signaling to the network device according to the first time position, a second time position for transmitting the SR being at least partially overlapped with a third time position for transmitting the feedback information. The terminal device determines how to effectively transmit the information related to the control signaling and other information on the basis of time when the downlink control signaling is received, so that different information may still be effectively transmitted under the situation that Physical Uplink Control Channels (PUCCHs) of two different lengths exist.

27 Claims, 4 Drawing Sheets

(51) Int. Cl.
*H04L 5/00* (2006.01)
*H04W 72/04* (2009.01)
*H04W 80/08* (2009.01)

(52) U.S. Cl.
CPC ........... *H04L 5/0055* (2013.01); *H04W 72/04* (2013.01); *H04W 72/042* (2013.01); *H04W 80/08* (2013.01)

(58) Field of Classification Search
CPC ....... H04L 1/0026–0028; H04L 1/0031; H04L 5/0053–0057
See application file for complete search history.

(56) References Cited

U.S. PATENT DOCUMENTS

| | | | |
|---|---|---|---|
| 2013/0039423 | A1 | 2/2013 | Helle et al. |
| 2016/0094996 | A1 | 3/2016 | Xiong |
| 2017/0164352 | A1 | 6/2017 | Yang et al. |
| 2017/0215206 | A1 | 7/2017 | Cheng et al. |
| 2019/0215126 | A1* | 7/2019 | Choi .................... H04L 5/0055 |

FOREIGN PATENT DOCUMENTS

| | | |
|---|---|---|
| EP | 2922366 A2 | 9/2015 |
| EP | 3065448 A1 | 9/2016 |

OTHER PUBLICATIONS

Written Opinion of the International Search Authority in International Application No. PCT/CN2018/072418, dated Sep. 27, 2018.
Supplementary European Search Report in European application No. 18874985.7, dated Oct. 9, 2019.
Motorola Mobility et al: "Multiplexing of uplink channels with different transmission durations", 3GPP Draft; R1-1720927 Multiplexing of Uplink Channels, 3rd Generation Partnership Project (3GPP), vol. RAN WG1, no. Reno, USA; Nov. 27, 2017-Dec. 1, 2017 Nov. 18, 2017 (Nov. 18, 2017), XP051370305, Retrieved from he Internet: URL:http://www.3gpp.org/ftp/tsg%5Fran/WG1%5FRL1/TSGR1%5F91/Docs/ [retrieved on Nov. 18, 2017] * section 2; figure 1 *.
Qualcomm Incorporated: "Channelization of 1-symbol short PUCCH with 1 or 2 bits payload", 3GPP Draft; R1-1718559_Channelization of 1-Symbol Short PUCCH With 1 or 2 Bits Payload, 3rd Generation Partnership Project (3GPP), vol. RAN WG1, no. Prague, CZ; Oct. 9, 2017-Oct. 13, 2017 Oct. 8, 2017 (Oct. 8, 2017), XP051341740, Retrieved from the Internet: URL:http://www.3gpp.org/ftp/Meetings_3GPP_SYNC/RAN1/Docs/ [retrieved on Oct. 8, 2017] * paragraph [0008]-paragraph [0011] *.
First Office Acton of the European application No. 18874985.7, dated Jun. 3, 2020.
MediaTek Inc. "Discussion on separate UCI encoding for long-PUCCH", 3GPP TSG RAN WG1 Meeting 91 R1-1719571, Nov. 18, 2017, 4 pages.
LG Electronics. "UCI on PUSCH and UL channgel multiplexing for NR", 3GPP TSG RAN WG1 Meeting 91 R1-1719927, Nov. 18, 2017, 17 pages.
Catt "On design of long PUCCH formats for more than 2 UCI bits" 3GPP TSG RAN WG1 Meeting 91 R1-1720198, Nov. 18, 2017, 6 pages.
International Search Report in the international application No. PCT/CN2018/072418, dated Sep. 27, 2018.
English Translation of the Written Opinion of the International Search Authority in the international application No. PCT/CN2018/072418, dated Sep. 27, 2018.
First Office Action of the Chilean application No. 201902040, dated Aug. 20, 2020.
First Office Action of the Canadian application No. 3052682, dated Sep. 11, 2020.
Second Office Action of the European application No. 18874985.7, dated Sep. 15, 2020.
First Office Action of the Chinese application No. 201911301451.8, dated Nov. 3, 2020.
Second Office Action of the Chilean application No. 201902040, dated Dec. 18, 2020.
Office Action of the Indian application No. 201917029910, dated Feb. 5, 2021.

* cited by examiner

METHODS AND DEVICES FOR INFORMATION TRANSMISSION

This application is a continuation of PCT Application No. PCT/CN2018/072418, filed on Jan. 12, 2018 and titled with "methods and devices for information transmission", the contents of which are hereby incorporated by reference in its entirety.

BACKGROUND

In a 5th-Generation (5G) system, Physical Uplink Control Channels (PUCCHs) of two lengths are supported, i.e., long PUCCHs and short PUCCHs. A terminal device may transmit different uplink information by use of different PUCCHs, for example, transmitting a Scheduling Request (SR) and feedback information (Acknowledgement (ACK) or Negative ACK (HACK)) through different PUCCHs. In such a case, how to transmit the SR and the feedback information more effectively becomes a problem urgent to be solved.

SUMMARY

The application relates to the field of communications, and more particularly to a method and device for information transmission.

The embodiments of the application provide a method and device for information transmission, which may still effectively transmit different information under the condition that PUCCHs of two lengths exist.

A first aspect provides a method for information transmission, which may include that: control signaling which is transmitted by a network device is received by a terminal device at a first time position; and second information corresponding to the control signaling and/or first information are/is transmitted by the terminal device to the network device according to the first time position, a second time position for transmitting the first information being at least partially overlapped with a third time position for transmitting the second information.

In such a manner, the terminal device determines how to effectively transmit the information related to the control signaling and other information on the basis of time when the downlink control signaling is received, so that different information may still be effectively transmitted under the condition that PUCCHs of two different lengths exist.

In a possible implementation mode, the first information may be an SR or periodic channel state information.

In a possible implementation mode, the second information may be feedback information corresponding to the control signaling, uplink data scheduled by the control signaling or aperiodic channel state information triggered by the control signaling.

In a possible implementation mode, the operation that the terminal device transmits the second information corresponding to the control signaling and/or the first information to the network device according to the first time position may include that: in response to a situation that the first time position is before the second time position, the terminal device transmits the second information and the first information by multiplexing.

In a possible implementation mode, the operation that the terminal device transmits the second information and the first information by multiplexing may include that: the terminal device transmits the second information and the first information by multiplexing at the third time position.

In a possible implementation mode, the operation that the terminal device transmits the second information and the first information by multiplexing may include that: the terminal device transmits the second information and the first information through a PUCCH configured to transmit the second information.

In a possible implementation mode, the operation that the terminal device transmits the second information and the first information by multiplexing may include that: the terminal device transmits the second information and the first information through a PUCCH indicated by the control signaling.

In a possible implementation mode, the situation that the first time position is before the second time position may include that: a last time-domain symbol of at least one time-domain symbol at the first time position is before a first time-domain symbol of at least one time-domain symbol at the second time position.

In a possible implementation mode, the operation that the terminal device transmits the second information corresponding to the control signaling and/or the first information to the network device according to the first time position may include that: in response to a situation that the first time position is after the second time position and the first information is positive, the terminal device at least transmits the first information; or, in response to a situation that the first time position is after the second time position and the first information is negative, the terminal device only transmits the second information.

In a possible implementation mode, the operation that the terminal device at least transmits the first information in response to the situation that the first time position is after the second time position and the first information is positive may include that: in response to a situation that the terminal device does not support simultaneous transmission of multiple PUCCHs, the terminal device only transmits the first information; or, in response to a situation that the terminal device supports simultaneous transmission of the multiple PUCCHs, the terminal device transmits the first information and the second information through two independent PUCCHs respectively.

In a possible implementation mode, the transmit power on different time-domain symbols occupied by the PUCCH configured to transmit the first information may be the same.

In a possible implementation mode, the situation that the first time position is after the second time position may include that: the last time-domain symbol of the at least one time-domain symbol at the first time position is after the first time-domain symbol of the at least one time-domain symbol at the second time position; or, the last time-domain symbol of the at least one time-domain symbol at the first time position is as same as the first time-domain symbol of the at least one time-domain symbol at the second time position.

In a possible implementation mode, the control signaling may include Downlink Control Information (DCI) or high-layer signaling.

In a possible implementation mode, the DCI may be configured to schedule dynamic Physical Downlink Shared Channel (PDSCH) transmission, or may be configured to activate semi-persistent PDSCH transmission, or may indicate semi-persistent resource release, or may be configured to indicate Bandwidth Part (BWP) activation/deactivation, or may be configured to indicate carrier activation/deactivation.

In a possible implementation mode, the high-layer signaling may be configured to set a parameter for semi-persistent PDSCH transmission.

A second aspect provides a method for information transmission, which may include that: control signaling is transmitted by a network device to a terminal device at a first time position; and second information corresponding to the control signaling and/or first information transmitted by the terminal device according to the first time position are/is received by the network device, a second time position for transmitting the first information being at least partially overlapped with a third time position for transmitting the second information.

In such a manner, the network device determines how to effectively receive the information related to the control signaling and other information on the basis of time when the downlink control signaling is transmitted, so that different information may still be effectively transmitted under the condition that PUCCHs of two different lengths exist.

In a possible implementation mode, the first information may be an SR or periodic channel state information.

In a possible implementation mode, the second information may be feedback information corresponding to the control signaling, uplink data scheduled by the control signaling or aperiodic channel state information triggered by the control signaling.

In a possible implementation mode, the operation that the network device receives the second information corresponding to the control signaling and/or the first information, transmitted by the terminal device according to the first time position may include that: in response to a situation that the first time position is before the second time position, the network device receives the second information and the first information which are transmitted by the terminal device by multiplexing.

In a possible implementation mode, the operation that the network device receives the second information and the first information which are transmitted by the terminal device by multiplexing may include that: the network device receives the second information and the first information which are transmitted by the terminal device by multiplexing at the third time position.

In a possible implementation mode, the operation that the network device receives the second information and the first information which are transmitted by the terminal device by multiplexing may include that: the network device receives the second information and the first information which are transmitted by the terminal device through a PUCCH configured to transmit the second information.

In a possible implementation mode, the operation that the network device receives the second information and the first information transmitted by the terminal device by multiplexing may include that: the network device receives the second information and the first information which are transmitted by the terminal device through a PUCCH indicated by the control signaling.

In a possible implementation mode, the condition that the first time position is before the second time position may include that: a last time-domain symbol of at least one time-domain symbol at the first time position is before a first time-domain symbol of at least one time-domain symbol at the second time position.

In a possible implementation mode, the operation that the network device receives the first information and/or second information which is related to the control signaling, transmitted by the terminal device according to the first time position may include that: in response to a situation that the first time position is after the second time position and the first information is positive, the network device at least receives the first information transmitted by the terminal device; or, in response to a situation that the first time position is after the second time position and the first information is negative, the network device only receives the second information transmitted by the terminal device.

In a possible implementation mode, the operation that the network device at least receives the first information transmitted by the terminal device in response to the situation that the first time position is after the second time position and the first information is positive may include that: in response to a situation that the terminal device does not support simultaneous transmission of multiple PUCCHs, the network device only receives the first information transmitted by the terminal device; or, in response to a situation that the terminal device supports simultaneous transmission of the multiple PUCCHs, the network device receives the first information and second information transmitted by the terminal device through two independent PUCCHs respectively.

In a possible implementation mode, the transmit power may be the same on different time-domain symbols occupied by the PUCCH configured to transmit the first information.

In a possible implementation mode, the situation that the first time position is after the second time position may include that: the last time-domain symbol of the at least one time-domain symbol at the first time position is after the first time-domain symbol of the at least one time-domain symbol at the second time position; or, the last time-domain symbol of the at least one time-domain symbol at the first time position is as same as the first time-domain symbol of the at least one time-domain symbol at the second time position.

In a possible implementation mode, the control signaling may include DCI or high-layer signaling.

A third aspect provides a terminal device, which may execute operations of a terminal device in the first aspect or any optional implementation modes of the first aspect. Specifically, the terminal device may include modular units configured to execute the operations of the terminal device in the first aspect or any possible implementation mode of the first aspect.

A fourth aspect provides a network device, which may execute operations of a network device in the second aspect or any optional implementation modes of the second aspect. Specifically, the network device may include modular units configured to execute the operations of the network device in the second aspect or any possible implementation mode of the second aspect.

A fifth aspect provides a terminal device, which includes a processor, a transceiver and a memory. The processor, the transceiver and the memory may communicate with one another through an internal connecting path. The memory is configured to store an instruction, and the processor is configured to execute the instruction stored in the memory. When the processor executes the instruction stored in the memory, such execution enables the terminal device to execute the method in the first aspect or any possible implementation mode of the first aspect, or such execution enables the terminal device to implement the terminal device provided in the third aspect.

A sixth aspect provides a network device, which includes a processor, a transceiver and a memory. The processor, the transceiver and the memory may communicate with one another through an internal connecting path. The memory is configured to store an instruction, and the processor is configured to execute the instruction stored in the memory. When the processor executes the instruction stored in the memory, such execution enables the network device to execute the method in the second aspect or any possible implementation mode of the second aspect, or such execution enables the network device to implement the network device provided in the fourth aspect.

A seventh aspect provides a system chip, which includes an input interface, an output interface, a processor and a memory. The processor is configured to execute an instruction stored in the memory. When the instruction is executed, the processor may implement the method in the first aspect or any possible implementation mode of the first aspect.

An eighth aspect provides a system chip, which includes an input interface, an output interface, a processor and a memory. The processor is configured to execute an instruction stored in the memory. When the instruction is executed, the processor may implement the method in the second aspect or any possible implementation mode of the second aspect.

A ninth aspect provides a computer program product including an instruction, which runs on a computer to enable the computer to execute the method in the first aspect or any possible implementation modes of the first aspect.

A tenth aspect provides a computer program product including an instruction, which runs on a computer to enable the computer to execute the method in the second aspect or any possible implementation modes of the second aspect.

DETAILED DESCRIPTION

The technical solutions of the embodiments of the application may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system or a future 5G system.

Figure 1:
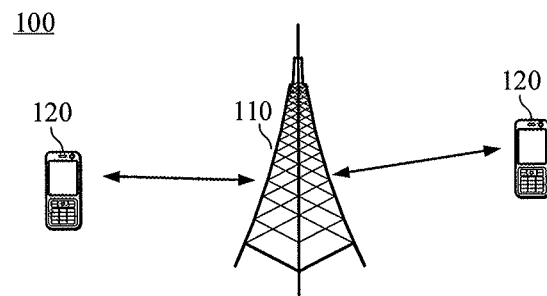
FIG. 1 is a schematic diagram of a wireless communication system according to an embodiment of the application.

FIG. 1 illustrates a wireless communication system 100 to which the embodiments of the application are applied. The wireless communication system 100 may include a network device 110. The network device 110 may be a device communicating with a terminal device. The network device 110 may provide communication coverage for a specific geographical region and may communicate with a terminal device (for example, User Equipment (UE)) in the coverage. Optionally, the network device 110 may be a Base Transceiver Station (BTS) in a GSM or a CDMA system, or may also be a NodeB (NB) in a WCDMA system, or may be an Evolutional Node B (eNB or eNodeB) in an LTE system or a wireless controller in a Cloud Radio Access Network (CRAN). Or the network device may be a relay station, an access point, a vehicle-mounted device, a wearable device, a network-side device in a future 5G network, a network device in a future evolved Public Land Mobile Network (PLMN) or the like.

The wireless communication system 100 further includes at least one terminal device 120 within the coverage of the network device 110. The terminal devices 120 may be mobile or fixed. Optionally, the terminal device 120 may be an access terminal, UE, a subscriber station, a user station, a mobile radio station, a mobile station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device, other processing devices connected to a wireless modem, a vehicle-mounted device, a wearable device, a terminal device in a future 5G network, a terminal device in a future evolved PLMN or the like.

Optionally, the terminal devices 120 may perform Device to Device (D2D) communication.

Optionally, the 5G system or network may also be called a New Radio (NR) system or network.

A network device and two terminal devices are exemplarily shown in FIG. 1. Optionally, the wireless communication system 100 may include multiple network devices, and other number of terminal devices, besides two terminal devices, may be included in coverage of each network device. There are no limits made thereto in the embodiments of the application.

Optionally, the wireless communication system 100 may further include other network entities such as a network controller and a mobility management entity. There are no limits made thereto in the embodiments of the application.

In an NR system, PUCCHs of two lengths are supported, i.e., long PUCCHs and short PUCCHs. Optionally, a short PUCCH includes 1~2 time-domain symbols, and a long PUCCH includes 4~14 time-domain symbols. A terminal device may transmit different information by use of different PUCCHs, for example, transmitting a SR and feedback information (ACK/NACK) through different PUCCHs.

An uplink control channel parameter used for transmission of an SR is usually semi-persistently configured (for example, a configuration period, an offset and a PUCCH resource). When a terminal device has an SR, a PUCCH configured to bear the SR is transmitted on a corresponding resource; and when the terminal device has no SR, no information is transmitted on the corresponding resource. A transmission period of an SR (at least for an SR transmitted by a short PUCCH) may at least be equal to X time-domain symbols, and a value of X may be, for example, 1. For example, the SR may be configured to be transmitted by a long PUCCH (for example, PUCCH format 1), and the ACK/NACK may be configured to be transmitted by a short PUCCH (PUCCH format 2).

If there is a conflict between transmission of an SR and transmission of an ACK/NACK on a time domain, how to transmit the SR and the ACK/NACK becomes a problem urgent to be solved.

In the embodiments of the application, a terminal device determines how to effectively transmit information related to control signaling and other information on the basis of time when downlink control signaling is received, so that different information may still be effectively transmitted under the situation that PUCCHs of two different lengths exist.

Figure 2:
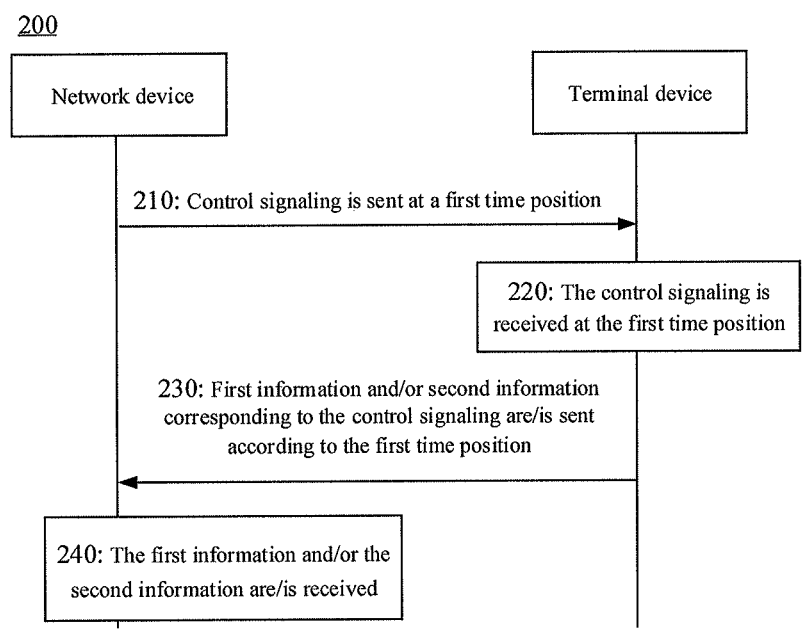
FIG. 2 is an interaction flowchart of a method for information transmission according to an embodiment of the disclosure.

FIG. 2 is an interaction flowchart of a method for information transmission according to an embodiment of the application. A network device shown in FIG. 2 may be, for example, the network device 110 shown in FIG. 1, and a terminal device shown in FIG. 2 may be, for example, the terminal device 120 shown in FIG. 1. As shown in FIG. 2, the communication method includes the following steps.

In 210, the network device transmits control signaling to the terminal device at a first time position.

In 220, the terminal device receives the control signaling transmitted by the network device at the first time position.

Optionally, the control signaling includes DCI or high-layer signaling. For example, the control signaling may be transmitted by a Physical Downlink Control Channel (PDCCH). The control signaling may be configured to schedule dynamic PDSCH transmission, or may be configured to activate a semi-persistently transmitted PDSCH, or may be configured to indicate the release of a Semi-Persistent Scheduling (SPS) resource, or may be configured to indicate activation or deactivation of a BWP, or may be configured to indicate activation or deactivation of a carrier and the like.

In 230, the terminal device transmits first information and/or second information which is related to the control signaling to the network device according to the first time position.

Here, a second time position configured to transmit the first information is at least partially overlapped with a third time position configured to transmit the second information.

Optionally, the first information is SR information or periodic channel state information.

Optionally, the second information is feedback information, uplink data or aperiodic channel state information.

It is to be understood that the second information is information corresponding to the control signaling, that is, the second information is related to the control signaling. For example, the second information may be information scheduled by the control signaling, information triggered by the control signaling, feedback information to the control signaling, or the like.

For example, the second information may be the uplink data scheduled by the control signaling; or the second information may be the aperiodic channel state information (for example, aperiodically transmitted Channel State Information Reference Signal (CSI-RS)) triggered by the control signaling; or the second information may be the feedback information (for example, an ACK or a NACK) to the control signaling, and is configured to give a feedback to the control signaling.

The first information is information unrelated to the control signaling, and the first information is transmitted independently of the control signaling, and is not information scheduled on the basis of the control signaling or transmitted for the control signaling. For example, the first information may be an SR; or the first information may be periodic channel state information (for example, periodically transmitted CSI-RS, here, a transmission period of the CSI-RS may be set for the terminal device by a network in advance); or the first information may be other information not scheduled on the basis of the control signaling.

If the second time position is at least partially overlapped with the third time position, the terminal device determines a transmitting manner for the first information and the second information according to the first time position where the control signaling is received. The second information is information related to the control signaling. For example, the second information is the feedback information to the control signaling or information scheduled by the control signaling.

Optionally, the second time position is a time position pre-set or set by the network device to transmit the first information. For example, the network device may set a transmission period, offset, PUCCH resource and the like of the first information. It can be understood that the second time position is a time position originally to be adopted for transmission of the first information but a factor of the first time position is also required to be considered to determine whether to finally transmit the first information at the time position or not.

Optionally, the third time position is a time position pre-set or set by the network device to transmit the second information. For example, the network device may contain information of the third time position into the control signaling for indication to the terminal device. It can be understood that the third time position is a time position originally to be adopted for transmission of the second information but the factor of the first time position is also required to be considered to determine whether to finally transmit the second information at the time position or not.

If the second time position is at least partially overlapped with the third time position, then the terminal device determines whether to transmit the first information and/or the second information or not and determines a time or channel resource for transmitting the first information and/or the second information according to the first time position where the control signaling is received; and if the second time position is not overlapped with the third time position, then the terminal device may transmit the first information at the second time position and transmit the second information which is related to the control signaling at the third time position.

In 240, the network device receives, from the terminal device according to the first time position, the first information and/or second information which is related to the control signaling.

Here, the second time position for transmitting the first information is at least partially overlapped with the third time position for transmitting the second information.

If the second time position is at least partially overlapped with the third time position, the network device may determine whether to receive the first information and/or the second information or not and determine a time or channel resource for receiving the first information and/or the second information according to the first time position where the control signaling is received. If the second time position is not overlapped with the third time position, the network device may receive the first information at the second time position and receive the second information which is related to the control signaling at the third time position.

In such a manner, the terminal device determines how to effectively transmit the information related to the control signaling and other information on the basis of time when the downlink control signaling is received, so that different information may still be effectively transmitted under the situation that PUCCHs of two different lengths exist.

There exist two situations in the embodiments of the application. One is that the first time position is before the second time position, and another is the first time position is after the second time position. Transmission of the first information and the second information under the two situations will be described below respectively.

A First Situation

Optionally, in 230, if the first time position is before the second time position, then the terminal device transmits the second information and the first information by multiplexing.

Correspondingly, when the first time position is before the second time position, the network device receives the second information and the first information which are transmitted by the terminal device by multiplexing.

Optionally, the situation that the first time position is before the second time position includes that: a last time-domain symbol of at least one time-domain symbol at the first time position is before a first time-domain symbol of at least one time-domain symbol at the second time position.

Optionally, the multiplexing transmission manner refers to packing the second information and the first information for transmission together. For example, the second information and the first information are transmitted by use of the same control channel.

Optionally, the operation that the terminal device transmits the second information and the first information by multiplexing includes that: the terminal device may transmit the second information and the first information by multiplexing at the third time position. Correspondingly, the network device receives at the third time position the second information and the first information which are transmitted by the terminal device by multiplexing.

Optionally, the operation that the terminal device transmits the second information and the first information by multiplexing includes that: the terminal device transmits the second information and the first information through a PUCCH configured to transmit the second information. Correspondingly, the network device receives the second information and the first information which are transmitted by the terminal device through the PUCCH configured to transmit the second information.

Optionally, the operation that the terminal device transmits the second information and the first information by multiplexing includes that: the terminal device transmits the second information and the first information through a PUCCH indicated by the control signaling. Correspondingly, the network device receives the second information and the first information which are transmitted by the terminal device through the PUCCH indicated by the control signaling.

Figure 3A:
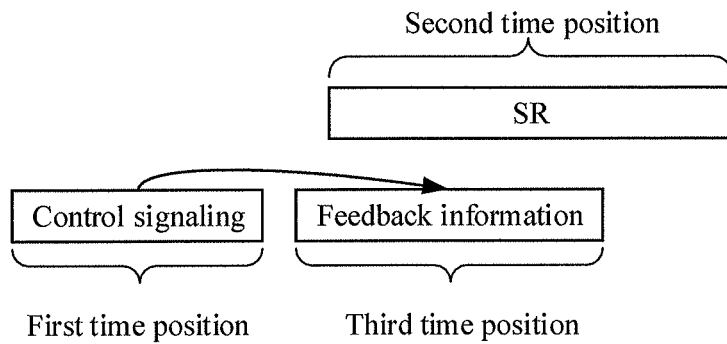
FIG. 3A, FIG. 3B and FIG. 3C are schematic diagrams of transmitting an SR and feedback information according to an embodiment of the disclosure.
Figure 3B:
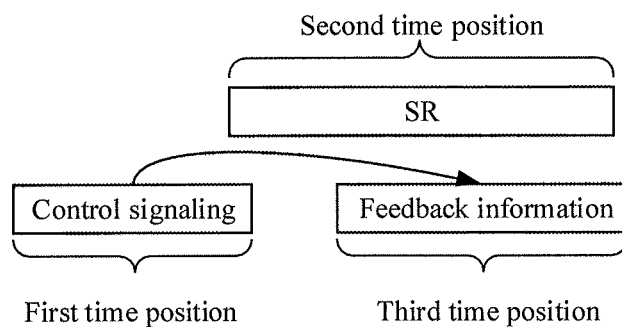
Figure 3C:
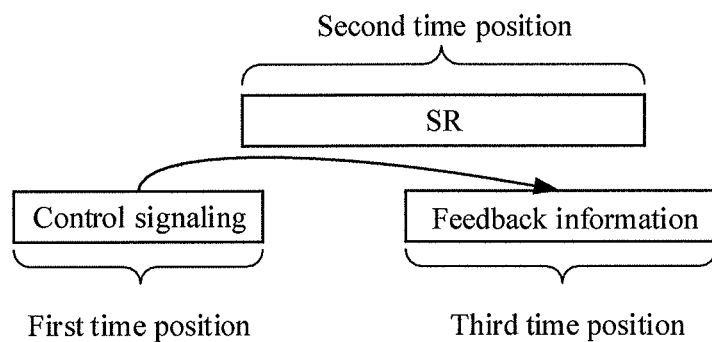

For example, as shown in FIG. 3A to FIG. 3C, there is made such a hypothesis that the first information is an SR and the second information is feedback information to control signaling. The terminal device receives the control signaling transmitted by the network device at the first time position, and the control signaling indicates the terminal device to transmit the feedback information responding to the control signaling at the third time position. Herein, a PUCCH configured to transmit the feedback information may be a short PUCCH (PUCCH format 2). The second time position determined by the terminal device according to a configuration and configured to transmit the SR is after the first time position (that is, the first time position is before the second time position). Herein, a PUCCH configured to transmit the SR may be a long PUCCH (PUCCH format 1). It can be seen that, since the second time position is at least partially overlapped with the third time position and the first time position where the terminal device receives the control signaling transmitted by the network device is before the second time position, it is not suitable for the terminal device to transmit the SR at the first time position by use of the long PUCCH, and instead, the SR and the feedback information are transmitted together by use of the short PUCCH configured to transmit the feedback information at the third time position.

A Second Situation

Optionally, in 230, if the first time position is after the second time position and the first information is positive, then the terminal device at least transmits the first information; and if the first time position is after the second time position and the first information is negative, then the terminal device only transmits the second information.

Correspondingly, when the first time position is after the second time position and the first information is positive, the network device may at least receive the first information transmitted by the terminal device; and when the first time position is after the second time position and the first information is negative, the network device may only receive the second information transmitted by the terminal device.

Optionally, the situation that the first time position is after the second time position includes that: the last time-domain symbol in at least one time-domain symbol at the first time position is after the first time-domain symbol of at least one time-domain symbol at the second time position; or, the last time-domain symbol of the at least one time-domain symbol at the first time position is as same as the first time-domain symbol of the at least one time-domain symbol at the second time position.

Optionally, the first information being positive represents that there is the first information, and the first information being negative represents that there is no first information.

Optionally, the operation that the terminal device at least transmits the first information if the first time position is after the second time position and the first information is positive includes that: if the terminal device does not support simultaneous transmission of multiple PUCCHs, then the terminal device only transmits the first information; or, if the terminal device supports simultaneous transmission of the multiple PUCCHs, then the terminal device transmits the first information and the second information through two independent PUCCHs respectively.

Correspondingly, under the situation that the first time position is after the second time position and the first information is positive, if the terminal device does not support simultaneous transmission of the multiple PUCCHs, then the network device may only receive the first information from the terminal device; and if the terminal device supports simultaneous transmission of the multiple PUCCHs, then the network device may not only receive the first information transmitted by the terminal device but also receive the second information transmitted by the terminal device. Herein, the first information and the second information are transmitted by the terminal device through two independent PUCCHs respectively.

Optionally, the transmit power of the first information on all time-domain symbols occupied by the PUCCH configured to transmit the first information is the same.

Optionally, the first information is information transmitted through a long PUCCH, and the second information is information transmitted through a short PUCCH; or, the first information is information transmitted through a short PUCCH, and the second information is information transmitted through a long PUCCH.

Figure 4A:
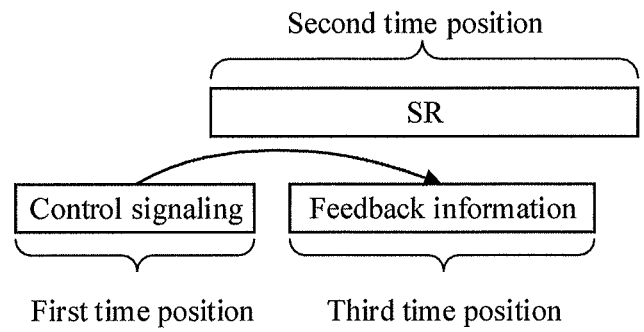
FIG. 4(a) and FIG. 4(b) are schematic diagrams of transmitting an SR and feedback information according to an embodiment of the disclosure.
Figure 4B:
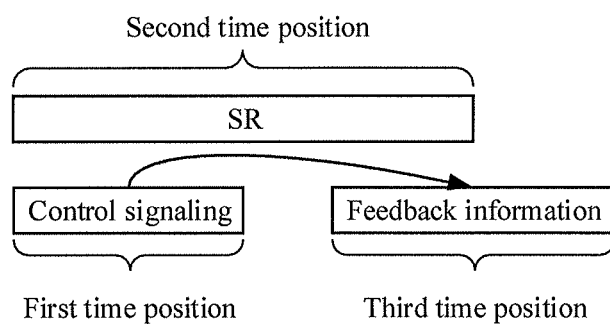

For example, as shown in FIG. 4(a) and FIG. 4(b), there is made such a hypothesis that the first information is SR and the second information is feedback information to the control signaling. The terminal device receives the control signaling transmitted by the network device at the first time position, and the control signaling indicates the terminal device to transmit the feedback information responding to the control signaling at the third time position. Herein, the PUCCH configured to transmit the feedback information may be a short PUCCH (PUCCH format 2). The second time position determined by the terminal device according to a configuration and configured to transmit the SR is before the first time position (that is, the first time position is after the second time position). Herein, the PUCCH configured to transmit the SR may be a long PUCCH (PUCCH format 1). It can be seen that, since the second time position is at least partially overlapped with the third time position and the first time position where the terminal device receives the control signaling transmitted by the network device is after the second time position, when the SR is positive (that is, there is an SR), the terminal device is required to transmit the SR by use of a long PUCCH. A time-domain spread spectrum technology is adopted for a long PUCCH and, if transmission of the SR is terminated in advance in such a case, orthogonality may be damaged, and thus transmission of the SR should be continued.

Furthermore, if the terminal device supports simultaneous transmission of multiple PUCCHs, then the terminal device may transmit the feedback information by use of a short PUCCH, and if the terminal device does not support simultaneous transmission of multiple PUCCHs, then the feedback information is discarded.

When the SR is negative (there is no SR), the terminal device only transmits the feedback information (ACK/NACK) by use of the short PUCCH.

Figure 5:
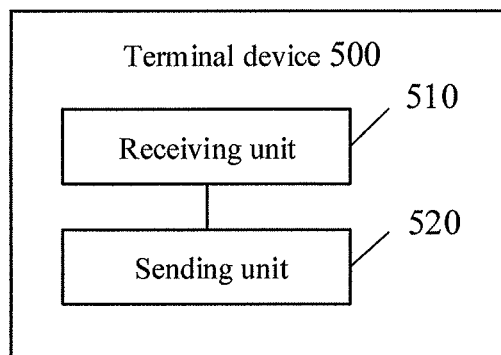
FIG. 5 is a schematic block diagram of a terminal device according to an embodiment of the disclosure.

FIG. 5 is a schematic block diagram of a terminal device 500 according to an embodiment of the application. As shown in FIG. 5, the terminal device 500 includes a receiving unit 510 and a transmitting unit 520.

The receiving unit 510 is configured to receive control signaling from a network device at a first time position.

The transmitting unit 520 is configured to transmit first information and/or second information which is related to the control signaling to the network device according to the first time position where the receiving unit receives the control signaling.

A second time position configured to transmit the first information is at least partially overlapped with a third time position configured to transmit the second information.

In such a manner, the terminal device determines how to effectively transmit the information related to the control signaling and other information on the basis of time when the downlink control signaling is received, so that different information may still be effectively transmitted under the situation that PUCCHs of two different lengths exist.

Optionally, the first information is an SR or periodic channel state information.

Optionally, the second information is feedback information, uplink data or aperiodic channel state information.

Optionally, the transmitting unit 520 is specifically configured to, if the first time position is before the second time position, transmit the second information and the first information by multiplexing.

Optionally, the transmitting unit 520 is specifically configured to transmit the second information and the first information by multiplexing at the third time position.

Optionally, the transmitting unit 520 is specifically configured to transmit the second information and the first information through a PUCCH configured to transmit the second information.

Optionally, the transmitting unit 520 is specifically configured to transmit the second information and the first information through a PUCCH indicated by the control signaling.

Optionally, the situation that the first time position is before the second time position includes that: a last time-domain symbol of at least one time-domain symbol at the first time position is before a first time-domain symbol of at least one time-domain symbol at the second time position.

Optionally, the transmitting unit 520 is specifically configured to: if the first time position is after the second time position and the first information is positive, at least transmit the first information; or, if the first time position is after the second time position and the first information is negative, only transmit the second information.

Optionally, if the first time position is after the second time position and the first information is positive, the transmitting unit 520 is specifically configured to: if the terminal device does not support simultaneous transmission of multiple PUCCHs, only transmit the first information; or, if the terminal device supports simultaneous transmission of the multiple PUCCHs, transmit the first information and the second information through two independent PUCCHs respectively.

Optionally, the transmit power may be the same on different time-domain symbols occupied by the PUCCH configured to transmit the first information.

Optionally, the situation that the first time position is after the second time position includes that: the last time-domain symbol of the at least one time-domain symbol at the first time position is after the first time-domain symbol of the at least one time-domain symbol at the second time position; or, the last time-domain symbol of the at least one time-domain symbol at the first time position is as same as the first time-domain symbol of the at least one time-domain symbol at the second time position.

Optionally, the control signaling includes DCI or high-layer signaling.

It is to be understood that the terminal device 500 may execute corresponding operations executed by the terminal device in the method 200 and, for simplicity, will not be elaborated herein.

Figure 6:
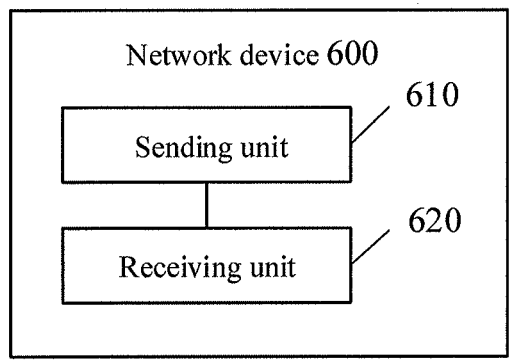
FIG. 6 is a schematic block diagram of a network device according to an embodiment of the disclosure.

FIG. 6 is a schematic block diagram of a network device 600 according to an embodiment of the application. As shown in FIG. 6, the network device 600 includes a transmitting unit 610 and a receiving unit 620.

The transmitting unit 610 is configured to transmit control signaling to a terminal device at a first time position.

The receiving unit 620 is configured to receive first information and/or second information which is related to the control signaling from the terminal device according to the first time position.

Herein, a second time position for transmitting the first information is at least partially overlapped with a third time position for transmitting the second information.

In such a manner, the network device determines how to effectively receive the information related to the control signaling and other information on the basis of time when the downlink control signaling is transmitted, so that different information may still be effectively transmitted under the situation that PUCCHs of two different lengths exist.

Optionally, the first information is SR information or periodic channel state information.

Optionally, the second information is feedback information, uplink data or aperiodic channel state information.

Optionally, the receiving unit 620 is specifically configured to, if the first time position is before the second time position, receive the second information and the first information which are transmitted by the terminal device by multiplexing.

Optionally, the receiving unit 620 is specifically configured to receive at the third time position the second information and the first information which are transmitted by the terminal device by multiplexing.

Optionally, the receiving unit 620 is specifically configured to receive the second information and the first information transmitted by the terminal device through a PUCCH configured to transmit the second information.

Optionally, the receiving unit 620 is specifically configured to receive the second information and the first information which are transmitted by the terminal device through a PUCCH indicated by the control signaling.

Optionally, the situation that the first time position is before the second time position includes that: a last time-domain symbol of at least one time-domain symbol at the first time position is before a first time-domain symbol of at least one time-domain symbol at the second time position.

Optionally, the receiving unit 620 is specifically configured to: if the first time position is after the second time position and the first information is positive, at least receive the first information from the terminal device; or, if the first time position is after the second time position and the first information is negative, only receive the second information from the terminal device.

Optionally, if the first time position is after the second time position and the first information is positive, the receiving unit 620 is specifically configured to: if the terminal device does not support simultaneous transmission of multiple PUCCHs, only receive the first information transmitted by the terminal device; or, if the terminal device supports simultaneous transmission of the multiple PUCCHs, receive the first information and second information which are transmitted by the terminal device through two independent PUCCHs respectively.

Optionally, the transmit power may be the same on different time-domain symbols occupied by the PUCCH configured to transmit the first information.

Optionally, the situation that the first time position is after the second time position includes that: the last time-domain symbol of the at least one time-domain symbol at the first time position is after the first time-domain symbol of the at least one time-domain symbol at the second time position; or, the last time-domain symbol of the at least one time-domain symbol at the first time position is the same as the first time-domain symbol of the at least one time-domain symbol at the second time position.

Optionally, the control signaling includes DCI or high-layer signaling.

It is to be understood that the network device 600 may execute corresponding operations executed by the network device in the method 200 and, for simplicity, will not be elaborated herein.

Figure 7:
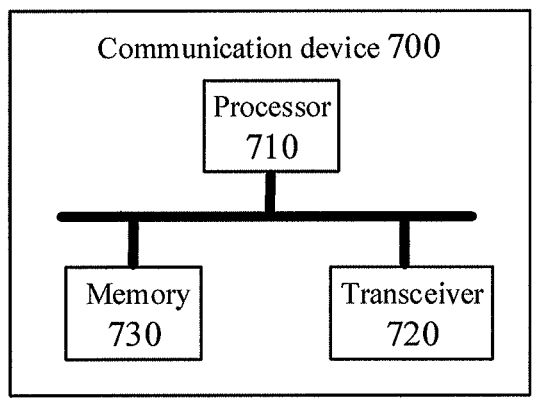
FIG. 7 is a schematic structure diagram of a communication device according to an embodiment of the disclosure.

FIG. 7 is a schematic structure diagram of a communication device 700 according to an embodiment of the application. As shown in FIG. 7, the communication device includes a processor 710, a transceiver 720 and a memory 730. The processor 710, the transceiver 720 and the memory 730 communicate with one another through an internal connecting path. The memory 730 is configured to store an instruction, and the processor 710 is configured to execute the instruction stored in the memory 730 to control the transceiver 720 to receive a signal or transmit a signal.

Optionally, the processor 710 may call the program code stored in the memory 730 to execute corresponding operations, executed by a terminal device, in the method 200. For similarity, no more elaborations will be made herein.

Optionally, the processor 710 may call the program code stored in the memory 730 to execute corresponding operations, executed by a network device, in the method 200. For similarity, no more elaborations will be made herein.

It is to be understood that the processor in the embodiment of the application may be an integrated circuit chip and has a signal processing capability. In an implementation process, each step of the method embodiment may be completed by an integrated logical circuit of hardware in the processor or an instruction in form of software. The processor may be a universal processor, a Digital Signal Processor (DSP), an Application Specific Integrated Circuit (ASIC), a Field Programmable Gate Array (FPGA) or other programmable logical device, a discrete gate or a transistor logical device and a discrete hardware component. Each method, step and logical block diagram disclosed in the embodiments of the application may be implemented or executed. The universal processor may be a microprocessor or the processor may also be any conventional processor and the like. The steps of the method disclosed in combination with the embodiments of the application may be directly embodied to be executed and completed by a hardware decoding processor or executed and completed by a combination of hardware and software modules in a decoding processor. The software module may be located in a mature storage medium in this field such as a Random Access Memory (RAM), a flash memory, a Read-Only Memory (ROM), a Programmable ROM (PROM) or an Electrically Erasable PROM (EEPROM) and a register. The storage medium is located in a memory, and the processor reads information in the memory, and completes the steps of the methods in combination with hardware.

It can be understood that the memory in the embodiment of the application may be a volatile memory or a nonvolatile memory, or may include both the volatile and nonvolatile memories. The nonvolatile memory may be a ROM, a PROM, an Erasable PROM (EPROM), an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the application is intended to include, but not limited to, memories of these and any other proper types.

Figure 8:
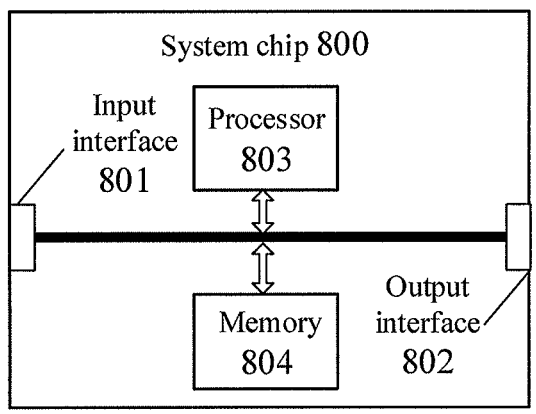
FIG. 8 is a schematic structure diagram of a system chip according to an embodiment of the disclosure.

FIG. 8 is a schematic structure diagram of a system chip according to an embodiment of the application. The system chip 800 of FIG. 8 includes an input interface 801, an output interface 802, at least one processor 803 and a memory 804. The input interface 801, the output interface 802, the processor 803 and the memory 804 are connected with one another through an internal connecting path. The processor 803 is configured to execute a code in the memory 804.

Optionally, when the code is executed, the processor 803 may implement corresponding operations executed by a terminal device in the method 200. For simplicity, no more elaborations will be made herein.

Optionally, when the code is executed, the processor 803 may implement corresponding operations executed by a network device in the method 200. For simplicity, no more elaborations will be made herein.

It is to be understood that, in the embodiments of the disclosure, "B corresponding to A" represents that B is associated with A and B may be determined according to A. It is also to be understood that determining B according to A does not mean that B is determined only according to A and B may also be determined according to A and/or other information.

Those of ordinary skill in the art may realize that the units and algorithm steps of each example described in combination with the embodiments disclosed in the application may be implemented by electronic hardware or a combination of computer software and the electronic hardware. Whether these functions are executed by hardware or software depends on specific applications and design constraints of the technical solutions. Professionals may realize the described functions for each specific application by use of different methods, but such realization shall fall within the scope of the application.

Those skilled in the art may clearly learn about that specific working processes of the system, device and unit described above may refer to the corresponding processes in the method embodiment and will not be elaborated herein for convenient and brief description.

In some embodiments provided by the application, it is to be understood that the disclosed system, device and method may be implemented in other manners. For example, the device embodiment described above is only schematic, and for example, division of the units is only logic functional division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the application may be integrated into a monitoring unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the application substantially or the parts making contributions to the conventional art or the part of the technical solutions may be embodied in form of software product, and the computer software product is stored in a storage medium, including a plurality of instructions configured to enable a computer device (which may be a personal computer, a server, a network device or the like) to execute all or part of the steps of the method in each embodiment of the application. The storage medium includes various media capable of storing program codes such as a U disk, a mobile hard disk, a ROM, a RAM, a magnetic disk or an optical disk.

The above is only the specific implementation mode of the application and not intended to limit the scope of protection of the application. Any variations or replacements apparent to those skilled in the art within the technical scope disclosed by the application shall fall within the scope of protection of the application. Therefore, the scope of protection of the application shall be subject to the scope of protection of the claims.

The invention claimed is:

1. A method for information transmission, comprising:
receiving, by a terminal device, control signaling from a network device at a first time position; and
determining, by the terminal device, a manner for transmitting second information corresponding to the control signaling and first information to the network device according to a relationship between the first time position and a second time position,
wherein the second time position is for transmitting the first information and is at least partially overlapped with a third time position for transmitting the second information, and the first time position is determined depending on when the control signaling is received by the terminal device.

2. The method of claim 1, wherein the first information is a Scheduling Request (SR) or periodic channel state information.

3. The method of claim 1, wherein the second information is Acknowledgement (ACK) or Negative ACK (NACK) information, uplink data or aperiodic channel state information.

4. The method of claim 1, wherein the determining, by the terminal device, a manner for transmitting second information corresponding to the control signaling and first information to the network device according to a relationship between the first time position and a second time position comprises:
in response to that the first time position is before the second time position, transmitting, by the terminal device, the second information and the first information by multiplexing.

5. The method of claim 4, wherein transmitting, by the terminal device, the second information and the first information by multiplexing comprises:
transmitting, by the terminal device, the second information and the first information by multiplexing at the third time position.

6. The method of claim 4, wherein the situation that the first time position is before the second time position comprises that:
a last time-domain symbol of at least one time-domain symbol at the first time position is before a first time-domain symbol of at least one time-domain symbol at the second time position.

7. The method of claim 1, wherein the control signaling comprises Downlink Control Information (DCI) or high-layer signaling.

8. A terminal device, comprising a processor, a transceiver and a memory where one or more program codes are stored, wherein the one or more program codes are configured to be executable by the processor to execute a step of:
controlling the transceiver to receive control signaling from a network device at a first time position; and
determining a manner for transmitting second information corresponding to the control signaling and first information to the network device according to a relationship between the first time position and a second time position,
wherein the second time position is for transmitting the first information and is at least partially overlapped with a third time position for transmitting the second information, and the first time position is determined depending on when the control signaling is received by the terminal device.

9. The terminal device of claim 8, wherein the first information is a Scheduling Request (SR) or periodic channel state information.

10. The terminal device of claim 8, wherein the second information is Acknowledgement (ACK) or Negative ACK (NACK) information, uplink data or aperiodic channel state information.

11. The terminal device of claim 8, wherein the one or more program codes are configured to be executable by the processor to execute a step of:
in response to that the first time position is before the second time position, controlling the transceiver to transmit the second information and the first information by multiplexing.

12. The terminal device of claim 11, wherein the one or more program codes are configured to execute the step further comprising:
controlling the transceiver to transmit the second information and the first information by multiplexing at the third time position.

13. The terminal device of claim 11, wherein the one or more program codes are configured to execute the step further comprising:
controlling the transceiver to transmit the second information and the first information through a Physical Uplink Control Channel (PUCCH) configured to transmit the second information.

14. The terminal device of claim 11, wherein the one or more program codes are configured to execute the step further comprising:
controlling the transceiver to transmit the second information and the first information through a PUCCH indicated by the control signaling.

15. The terminal device of claim 11, wherein the situation that the first time position is before the second time position comprises that:
a last time-domain symbol of at least one time-domain symbol at the first time position is before a first time-domain symbol of at least one time-domain symbol at the second time position.

16. The terminal device of claim 15, wherein responsive to that the control signaling is transmitted by a Physical Downlink Control Channel (PDCCH), the last time-domain symbol of the at least one time-domain symbol at the PDCCH at the first time position is before the first time-domain symbol of the at least one time-domain symbol at the second time position.

17. The terminal device of claim 8, wherein the one or more program codes are configured to be executable by the processor to further execute a step of:
controlling the transceiver to at least transmit the first information in response to a situation that the first time position is after the second time position and the first information is positive; or,
controlling the transceiver to only transmit the second information in response to a situation that the first time position is after the second time position and the first information is negative.

18. The terminal device of claim 17, wherein, in response to the situation that the first time position is after the second time position and the first information is positive, the one or more program codes are configured to execute the step further comprising:
in response to a situation that the terminal device does not support simultaneous transmission of multiple PUCCHs, controlling the transceiver to only transmit the first information; or
in response to a situation that the terminal device supports simultaneous transmission of the multiple PUCCHs, controlling the transceiver to transmit the first information and the second information through two independent PUCCHs respectively.

19. The terminal device of claim 18, wherein different time-domain symbols that the PUCCH configured to transmit the first information has have same transmit power.

20. The terminal device of claim 17, wherein the situation that the first time position is after the second time position comprises that:
a last time-domain symbol of at least one time-domain symbol at the first time position is after a first time-domain symbol of at least one time-domain symbol at the second time position;
or, a last time-domain symbol of at least one time-domain symbol at the first time position and a first time-domain symbol of at least one time-domain symbol at the second time position are the same time-domain symbol.

21. A network device, comprising a processor, a transceiver and a memory where one or more program codes are stored, wherein the one or more program codes are configured to be executable by the processor to execute a step of:
controlling the transceiver to transmit control signaling to a terminal device at a first time position; and
determining a manner for receiving first information and second information which is related to the control signaling, transmitted by the terminal device according to a relationship between the first time position and a second time position,
wherein the second time position is for transmitting the first information ands is at least partially overlapped with a third time position for transmitting the second information, and the first time position is determined depending on when the control signaling is transmitted to the terminal device.

22. The network device of claim 21, wherein the one or more program codes are configured to be executable by the processor to execute a step of:
in response to a situation that the first time position is before the second time position, controlling the transceiver to receive the second information and the first information which are transmitted by the terminal device by multiplexing.

23. The network device of claim 22, wherein the one or more program codes are configured to execute the step further comprising:
controlling the transceiver to receive the second information and the first information which are transmitted by the terminal device by multiplexing at the third time position.

24. A method for information transmission, comprising:
transmitting, by a network device, control signaling to a terminal device at a first time position; and
determining, by the network device, a manner for receiving second information corresponding to the control signaling and first information, transmitted by the terminal device according to a relationship between the first time position and a second time position, wherein the second time position is for transmitting the first information and is at least partially overlapped with a third time position for transmitting the second information, and the first time position is determined depending on when the control signaling is transmitted to the terminal device.

25. The method of claim 24, wherein the determining, by the network device, a manner for receiving second information corresponding to the control signaling and first information, transmitted by the terminal device according to a relationship between the first time position and a second time position comprises:

in response to a situation that the first time position is before the second time position, receiving, by the network device, the second information and the first information which are transmitted by the terminal device by multiplexing.

26. The method of claim 25, wherein receiving, by the network device, the second information and the first information which are transmitted by the terminal device by multiplexing comprises:

receiving, by the network device, the second information and the first information which are transmitted by the terminal device by multiplexing at the third time position.

27. A device comprising an input interface, an output interface and at least one processor, wherein the at least one processor is capable of executing one or more program codes to execute the method of claim 1.

* * * * *